United States Patent [19]

Tamamura et al.

[11] Patent Number: 5,128,673
[45] Date of Patent: Jul. 7, 1992

[54] SIGNAL GENERATOR FOR GENERATING A DELAYED CLOCK SIGNAL

[75] Inventors: Masaya Tamamura, Inagi; Shinji Emori, Urawa, both of Japan

[73] Assignee: Fujitsu Ltd., Kawasaki, Japan

[21] Appl. No.: 540,636

[22] Filed: Jun. 20, 1990

[30] Foreign Application Priority Data

Jun. 20, 1989 [JP] Japan ................................. 1-157908

[51] Int. Cl.⁵ ...................... H03M 9/00; H03B 19/00
[52] U.S. Cl. ..................................... 341/100; 341/101; 377/48
[58] Field of Search .................. 341/100, 101, 141; 377/46, 47, 48; 370/112, 108; 328/104, 105; 307/243, 244

[56] References Cited

U.S. PATENT DOCUMENTS 4,193,539  3/1980  Bowman et al. ............... 377/52 X
4,926,451  5/1990  Yoshihara et al. ................ 377/48

Primary Examiner—Sharon D. Logan
Attorney, Agent, or Firm—Staas & Halsey

[57] ABSTRACT

A signal generator having a Johnson counter including a plurality of flip-flops having CLOCK inputs to which a clock signal is inputted; a logic gate to which the clock signal and Q outputs of the flip-flops are inputted, the logic gate being constructed such that the clock signal is passed therethrough each time 2n clock pulses of the clock signal occur and that the logic gate outputs its output as a first signal, n representing the number of the flip-flops of the Johnson counter; and delay means for delaying the clock signal by a time corresponding to an input-output delayed time of the logic gate and for outputting the delayed clock signal as a second signal.

15 Claims, 14 Drawing Sheets

SIGNAL GENERATOR FOR GENERATING A DELAYED CLOCK SIGNAL

FIELD OF THE INVENTION

The present invention relates in general to a signal generator, and in particular to such a generator which is used in a data multiplexer or data demultiplexer.

DESCRIPTION OF THE PRIOR ART

By way of example, a conventional 4-bit data demultiplexer 1 is shown in FIG. 11. The demultiplexer 1 is provided with a serial/parallel conversion circuit 2 comprising four flip-flops FF100 through FF103 connected in series, and a data latch 3 comprising four flip-flops FF200 through FF203. The Q outputs of the flip-flops FF100 through FF103 of the serial/parallel conversion circuit 2 are connected to the D inputs of the flip-flops FF200 through FF203 of the data latch 3, respectively. The demultiplexer 1 is further provided with a signal generator 6 comprising a delay circuit 4 and a Johnson counter 5. The delay circuit 4 has a plurality of gates G1 through G3 connected in series and produces a delayed clock signal DCLK which is delayed by a predetermined delay time (td') proportional to the number of gate stages. The Johnson counter 5 has a plurality of flip-flops (in this example, two FF1 and FF2), and the $\overline{Q}$ output of the last stage of the flip-flops is connected to the D input of the first stage. The Johnson counter 5 produces a data load pulse signal DLP at a suitable time after data have been stored in all the flip-flops FF100 through FF103 of the serial/parallel conversion circuit 2. That is, the serial/parallel conversion circuit 2 loads serial data therein according to the delayed clock signal DCLK produced by the delay circuit 4, and after the data have been stored in all the flip-flops of the circuit 2, the data latch 3 holds the data of the serial/parallel conversion circuit 2 and outputs output data OUT1 through OUT4 according to the data load pulse signal DLP.

The above described conventional data demultiplexer 1 is constructed such that the Q output of the first stage (FF1) of the Johnson counter 5 goes high at the rising edge of the clock signal CLK after the $\overline{Q}$ output of the last stage (FF2) has gone high. This low-to-high transition of the Q output of the flip-flop FF1 is used as the data load pulse DLP. Therefore, during the time from the rising edge of the clock signal CLK to the rising edge of the Q output, that is, the time until the data load pulse DLP is obtained, there is a delay of time (hereinafter referred to as td') corresponding to the input-output delayed time (about 200 psec.) of the flip-flop FF1. Consequently, it is necessary that the delayed clock signal DCLK is delayed by td'. This delay td' of the delayed clock signal DCLK is always necessary in order to match the load timing of the serial data to the serial/parallel conversion circuit 2 with the latch timing to data latch 3. If the clock signal CLK is used instead of the delayed clock signal DCLK, the latch timing to the data latch will be delayed by td' with respect to the load timing of the serial data to the serial/parallel conversion circuit 2. As a result, the serial/parallel conversion circuit 2 is undesirably updated during the delay td'.

However, delaying the delayed clock signal by td' causes the serial data loading to be delayed by td'. This presents a problem that the output data from the multiplexer are delayed by td'. The flip-flops of the Johnson counter 5 are of the master-slave type as shown in FIG. 12. The flip flop of this kind contains a master flip-flop part ($SEC_M$), a slave flip-flop part ($SEC_S$), and a clock input part ($SEC_C$) After the D input has been loaded in the master flip-flop part ($SEC_M$), the data in the $SEC_M$ are outputted to the slave flip-flop part ($SEC_S$) in accordance with the clock signal from the clock input part ($SEC_C$) The input-output delayed time of the master-slave flip-flop is determined mainly by the propagation speed of the clock signal, that is, the propagation speed from the $SEC_C$ part to the $SEC_M$ part, $SEC_S$ part, and is approximately a delay of three gate stages (td'=about 200 psec.).

FIG. 13 shows a conventional multiplexer 10 provided with a data latch 11, a parallel/serial conversion circuit 12, and a data latch 13. The multiplexer 10 is further provided with a signal generator 16 comprising a delay circuit 14 and Johnson counter 15. The delay circuit 14 has a plurality of gates G1 through G3 connected in series and produces a delayed clock signal DCLK which is delayed by a predetermined delay time (td') proportional to the number of gate stages. The Johnson counter 15 produces a data load pulse signal DLP which is inputted to the data latch 11. As in the case of the demultiplexer of FIG. 11, the conventional multiplexer 10 has the same problem that the multiplexer output is delayed, since the signal DLP is produced through the flip-flop FF6 of the Johnson counter 15. The input-output delayed time of the flip-flop (FF6) of the Johnson counter 15 is approximately 200 psec.

SUMMARY OF THE INVENTION

It is therefore a main object of the present invention to provide an improved signal generator which can generate a first signal (DLP) and a second signal (DCLK) whose delayed amount are small.

It is another object of the present invention to provide an improved data multiplexer and demultiplexer which can be operated at high speeds with the aid of the signals DLP and DCLK.

In accordance with one important aspect of the present invention, there is provided a signal generator comprising: means to generate a clock signal; a Johnson counter including a plurality of flip-flops having CLOCK inputs to which the clock signal is inputted; a logic gate to which the clock signal and Q outputs of the flip-flops are inputted, the logic gate being constructed such that the clock signal is passed therethrough each time 2n clock pulses of the clock signal occur and that the logic gate outputs its output as a first signal, n representing the number of the flip-flops of the Johnson counter; and delay means for delaying the clock signal by a time corresponding to an input-output delayed time of the logic gate and for outputting the delayed clock signal as a second signal.

In accordance with another important aspect of the present invention, there is provided a data demultiplexer comprising: means to output serial data; means to generate a clock signal; a Johnson counter including a plurality of flip-flops having CLOCK inputs to which the clock signal is inputted; a logic gate to which the clock signal and Q outputs of the flip-flops are inputted, the logic gate being constructed such that the clock signal is passed therethrough each time 2n clock pulses of the clock signal occur and that the logic gate outputs its output as a first signal, n representing the number of the flip-flops of the Johnson counter; delay means for delaying the clock signal by a time corresponding to an input-output delayed time of the logic gate and for outputting the delayed clock signal as a second signal; conversion means for converting serial data to parallel data in accordance with the second signal of the delay means; and latch means for holding and outputting the parallel data in accordance with the first signal of the logic gate.

In accordance with yet another important aspect of the present invention, there is provided a data multiplexer comprising: means to output parallel data; means to generate a clock signal; a Johnson counter including a plurality of flip-flops having CLOCK inputs to which the clock signal is inputted; a logic gate to which the clock signal and Q outputs of the flip-flops are inputted, the logic gate being constructed such that the clock signal is passed therethrough each time 2n clock pulses of the clock signal occur and that the logic gate outputs its output as a first signal, n representing the number of the flip-flops of the Johnson counter; delay means for delaying the clock signal by a time corresponding to an input-output delayed time of the logic gate and for outputting the delayed clock signal as a second signal; conversion means for converting parallel data to serial data in accordance with the first signal of the logic means; and latch means for holding and outputting the serial data in accordance with the second signal of the delay gate.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
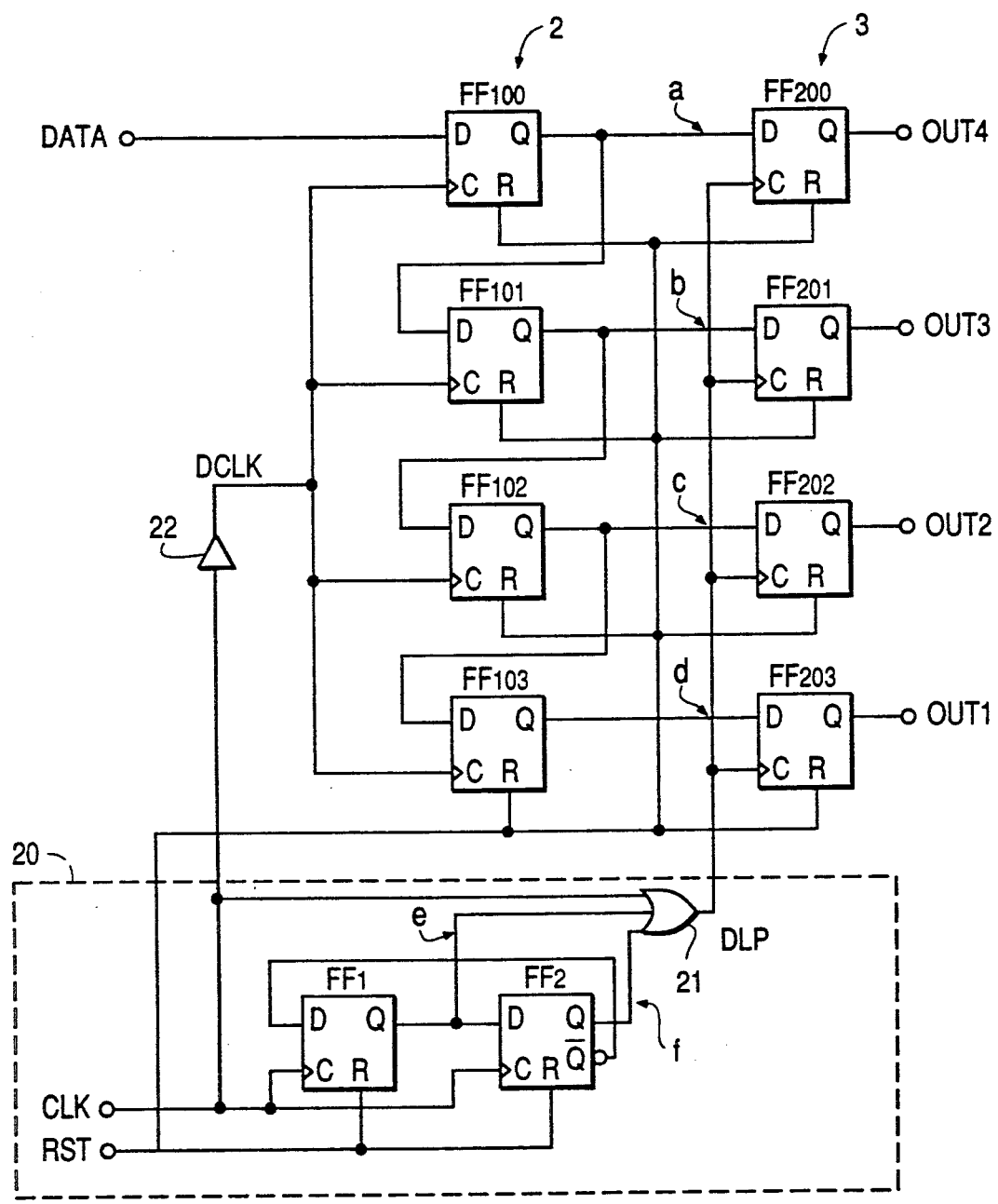
FIG. 1 is a schematic view showing the structure of a demultiplexer in which a signal generator according to the present invention is used.

Referring to FIG. 1, there is shown a 4-bit data demultiplexer in which a signal generator according to the present invention is used. The parts identical to corresponding parts of the conventional demultiplexer of FIG. 11 will be designated by the same reference numerals and characters. The demultiplexer is provided with a serial/parallel conversion circuit 2 comprising four flip-flops FF100 through FF103 connected in series, and a data latch 3 comprising four flip-flops FF200 through FF203. The Q outputs of the flip-flops FF100 through FF103 of the serial/parallel conversion circuit 2 are connected to the D inputs of the flip-flops FF200 through FF203 of the latch 3, respectively. Reference numeral 20 denotes a Johnson counter, which is provided with two flip-flop FF1 and FF2. The Johnson counter 20 is further provided with an OR gate 21 to which the Q outputs of the flip-flops FF1 and FF2 and a clock signal CLK are inputted. The flip-flops FF1 and FF2 of the Johnson counter 20 are identical in structure with the flip-flops of FF100 through FF103 of the serial/parallel conversion circuit 2. Reference numeral 22 denotes a delay circuit comprising a single gate. The delay circuit 22 produces a delayed clock signal DCLK that is delayed from the clock signal CLK by a delay time corresponding to the input-output delayed time (td) of the OR gate 21. The input-output delayed time of the OR gate 21 is approximately 100 picoseconds which is half the input-output delayed time (about 200 picoseconds) of the flip-flop FF1 of he Johnson counter.

Figure 2:
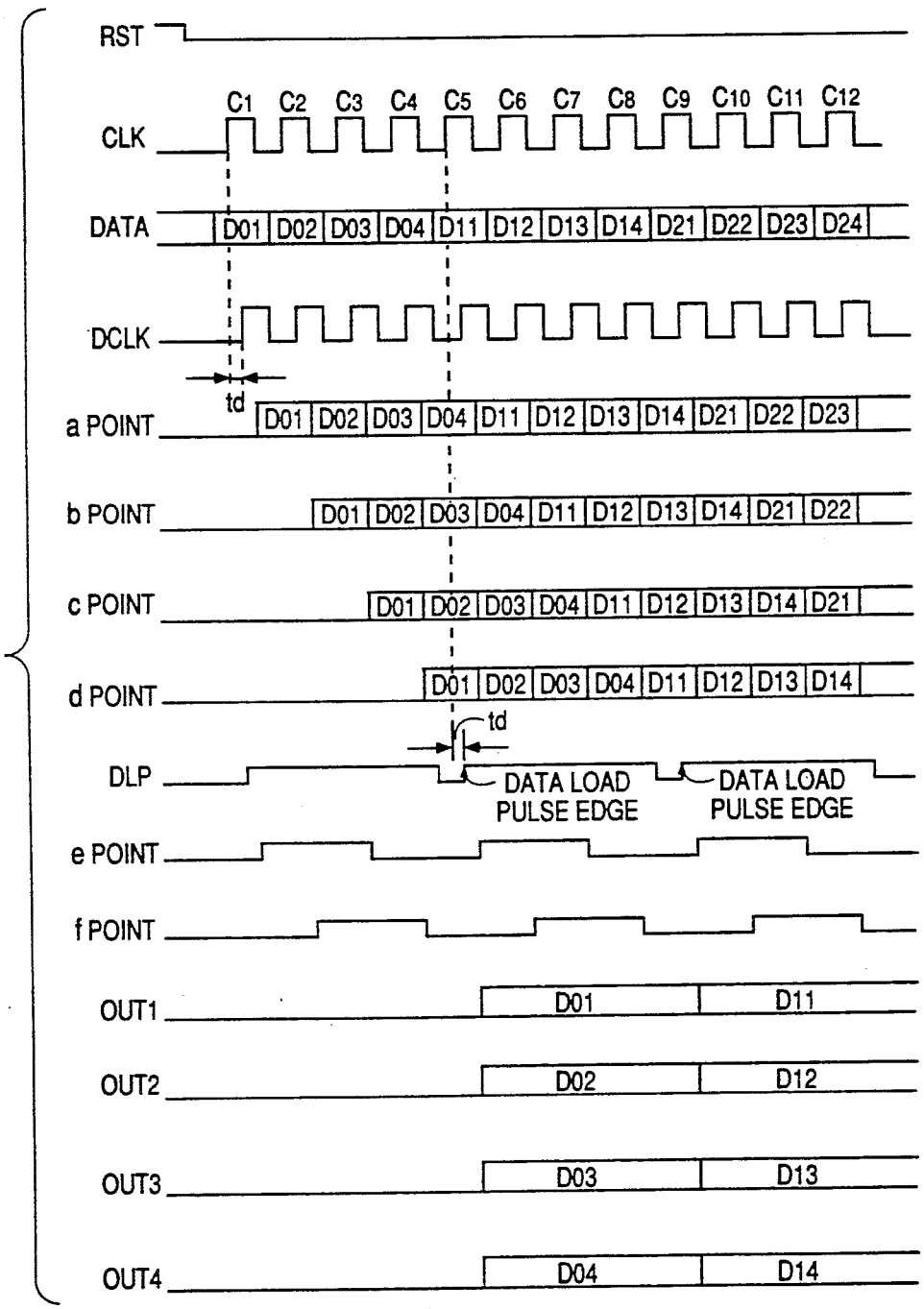
FIG. 2 is a timing diagram showing how the demultiplexer is operated.

The operation of the data demultiplexer of FIG. 1 is shown in the timing diagram of FIG. 2. At the fist rising edge of the delayed clock signal DCLK, data D01 will be present at the a point of FIG. 1. A the second rising edge of the clock signal DCLK, data D02 will be present at the a point, and the data D01 will be present at the b point. At the third rising edge of the clock signal DCLK, data D03 will be present at the a point, the data D02 will be present at the b point, and the data D01 will be present at the c point. At the fourth rising edge of the clock signal DCLK, data D04 will be present at the a point, the data D03 will be present at the b point, the data D02 will be present at the c point, and the data D01 will be present at the d point. As shown in FIG. 2, when the clock signal CLK rises at the fifth clock signal, and the Q outputs of the flip-flops FF1 and FF2 of the Johnson counter 20 are both low, the data load pulse signal DLP outputted from the OR gate 21 makes a low-to-high transition at the time delay of td from the rising edge of the fifth clock pulse of the clock signal CLK. As a result, the data D04, D03, D02 and D01 on the D inputs of the flip-flops FF200, FF201, FF202, and FF203 are transferred to the Q outputs of the flip-flops FF200, FF201, FF202, and FF203.

Figure 11:
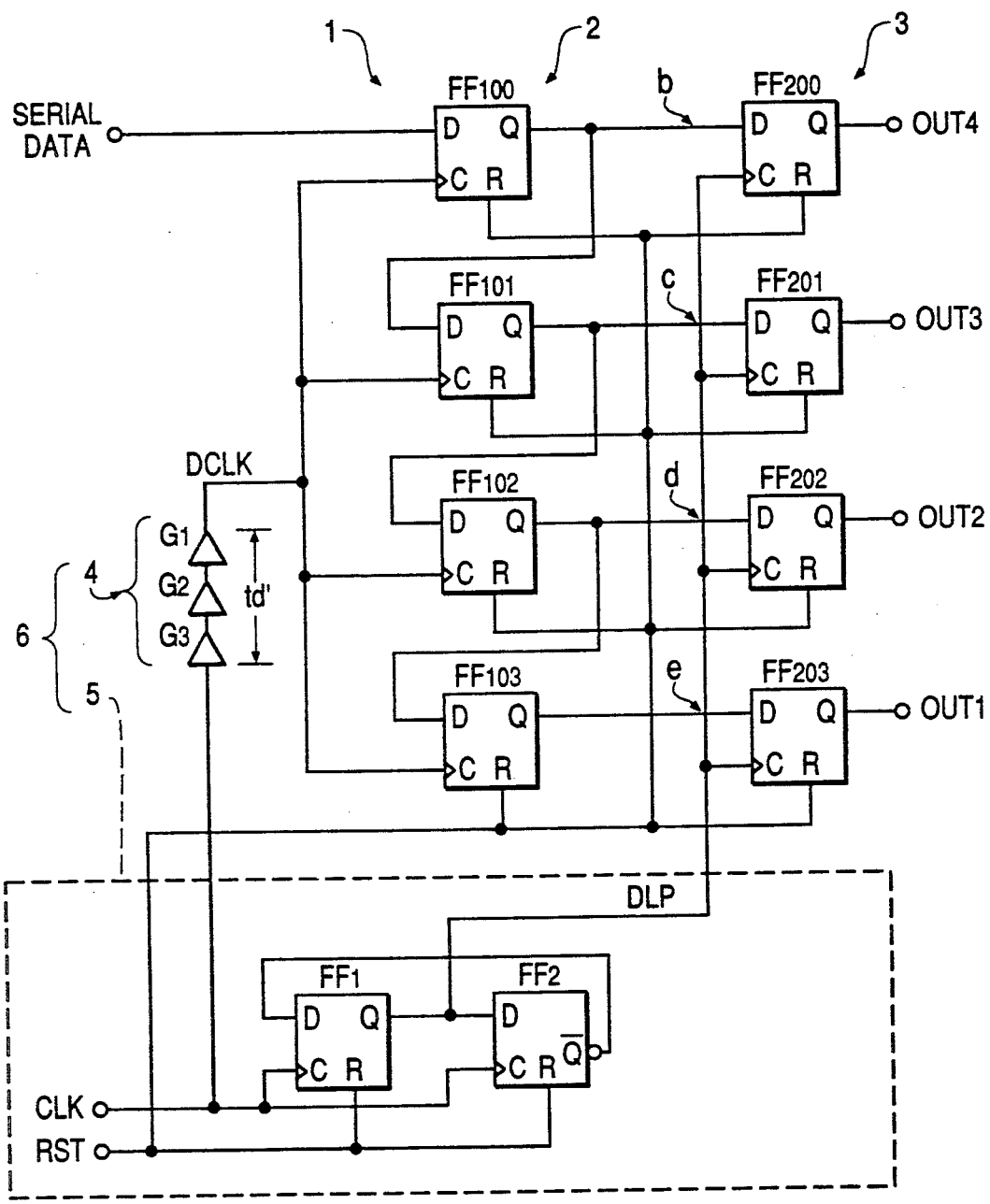
FIG. 11 is a schematic view showing a conventional demultiplexer.
Figure 12:
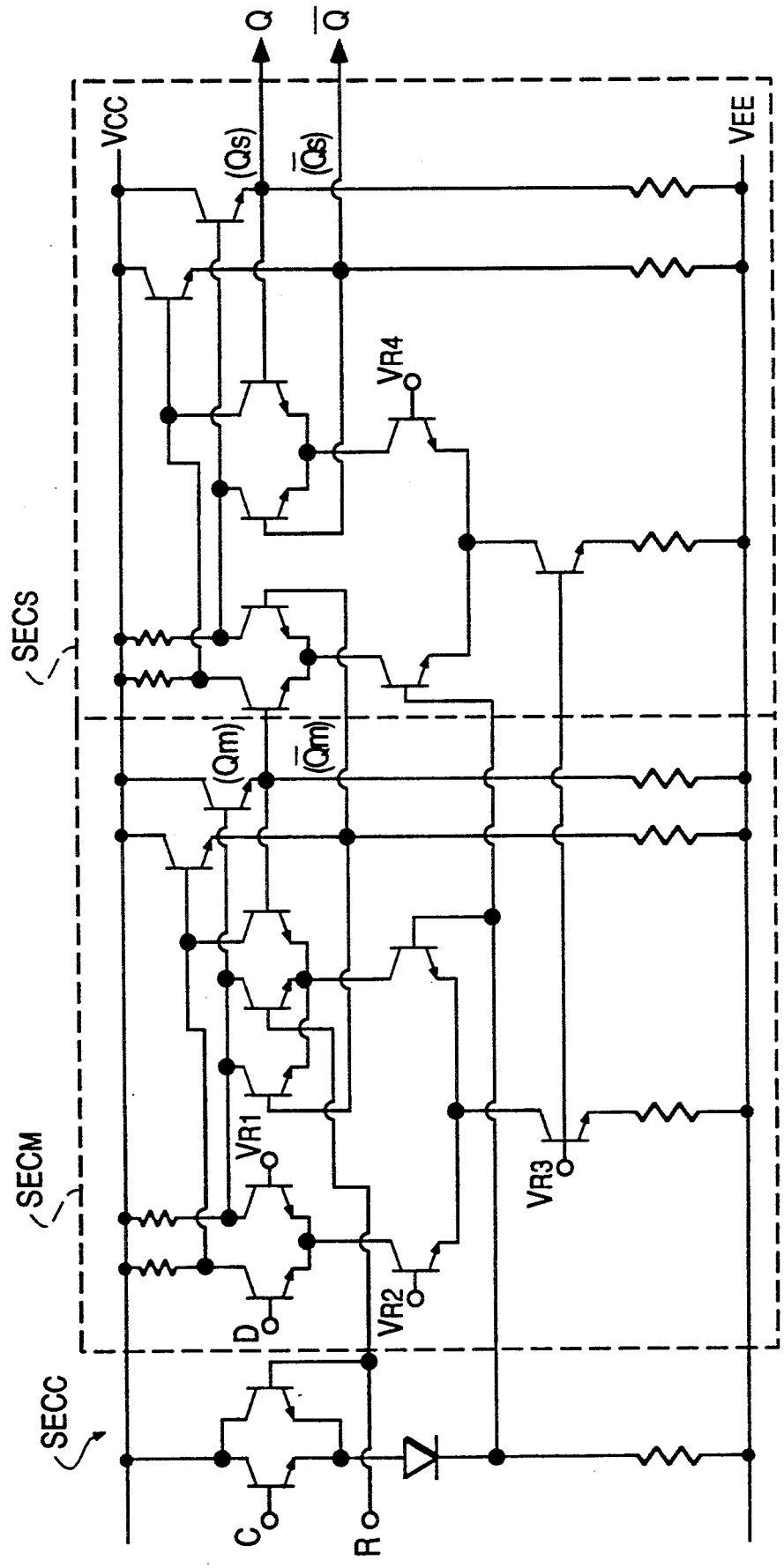
FIG. 12 schematically illustrates the structure of the flip-flop of the Johnson counter of FIG. 11.

Therefore, in the embodiment of FIG. 1 the OR gate 21 is provided to produce the data load pulse signal DLP the delayed time (about 100 psec.) of the signal DLP can be reduced by eliminating the amount of two gate stages, as compared with the delayed time (about 200 psec.) of the signal DLP produced by the flip-flip FF1 of the conventional Johnson counter 5 of FIG. 11. In addition, this reduction in the delayed time of the signal DPL can reduce the delayed time of the signal DCLK. Consequently, the multiplexer using the signals DCLK and DPL can be operated at high speeds.

Figure 3A:
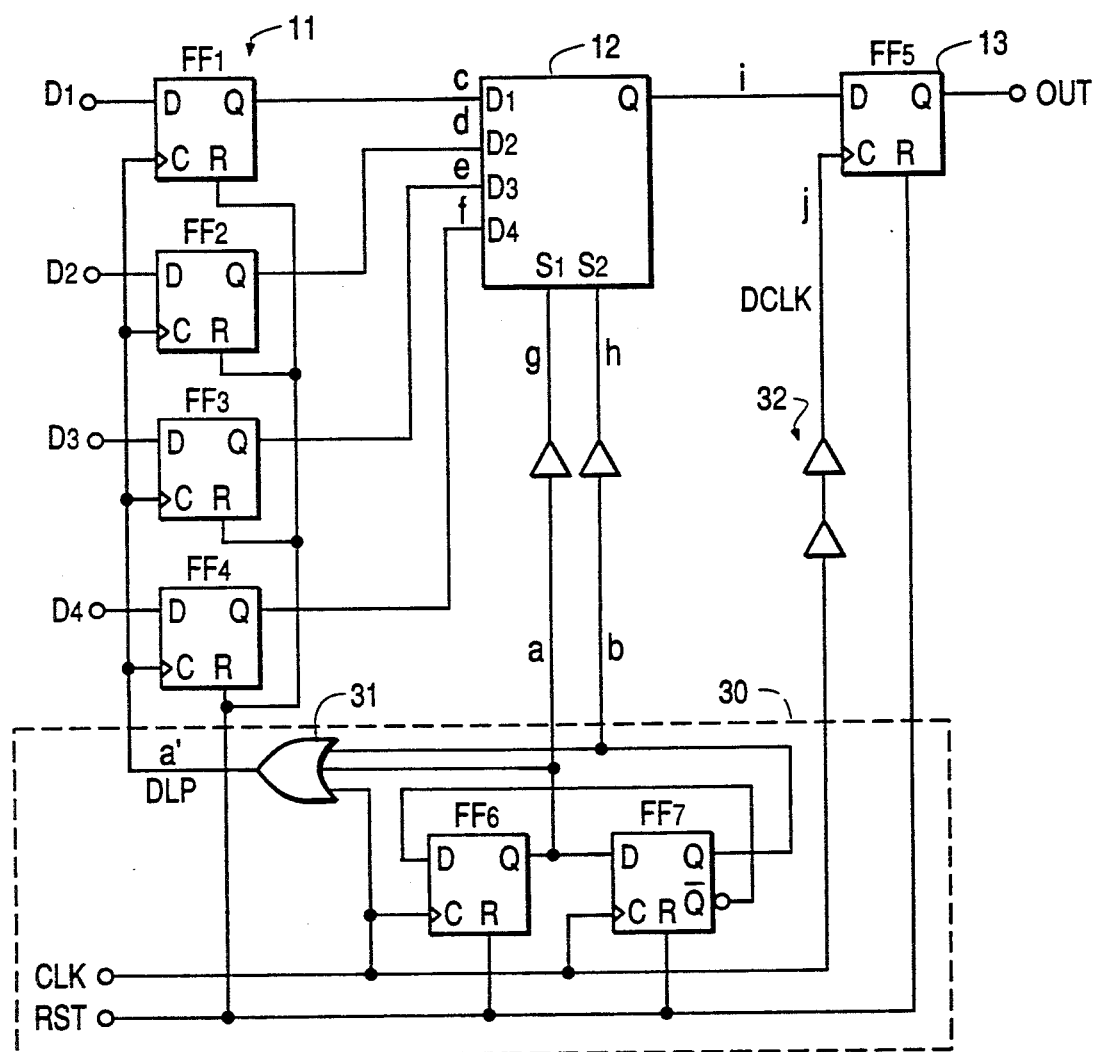
FIG. 3A is a schematic view showing the structure of a multiplexer in which a signal generator according to the present invention is used.
Figure 3B:
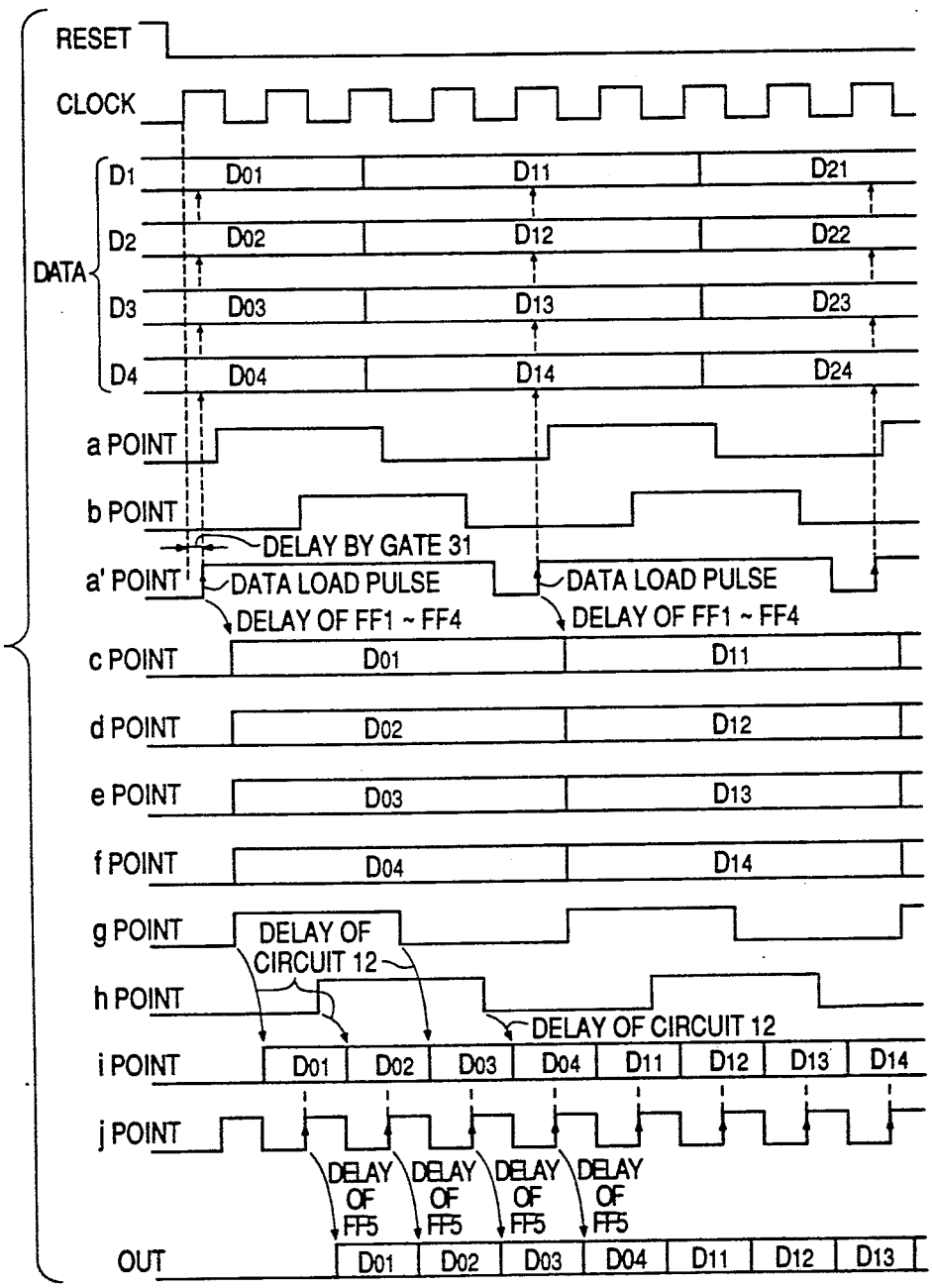
FIG. 3B is a timing diagram showing how the multiplexer of FIG. 3A is operated.
Figure 13:
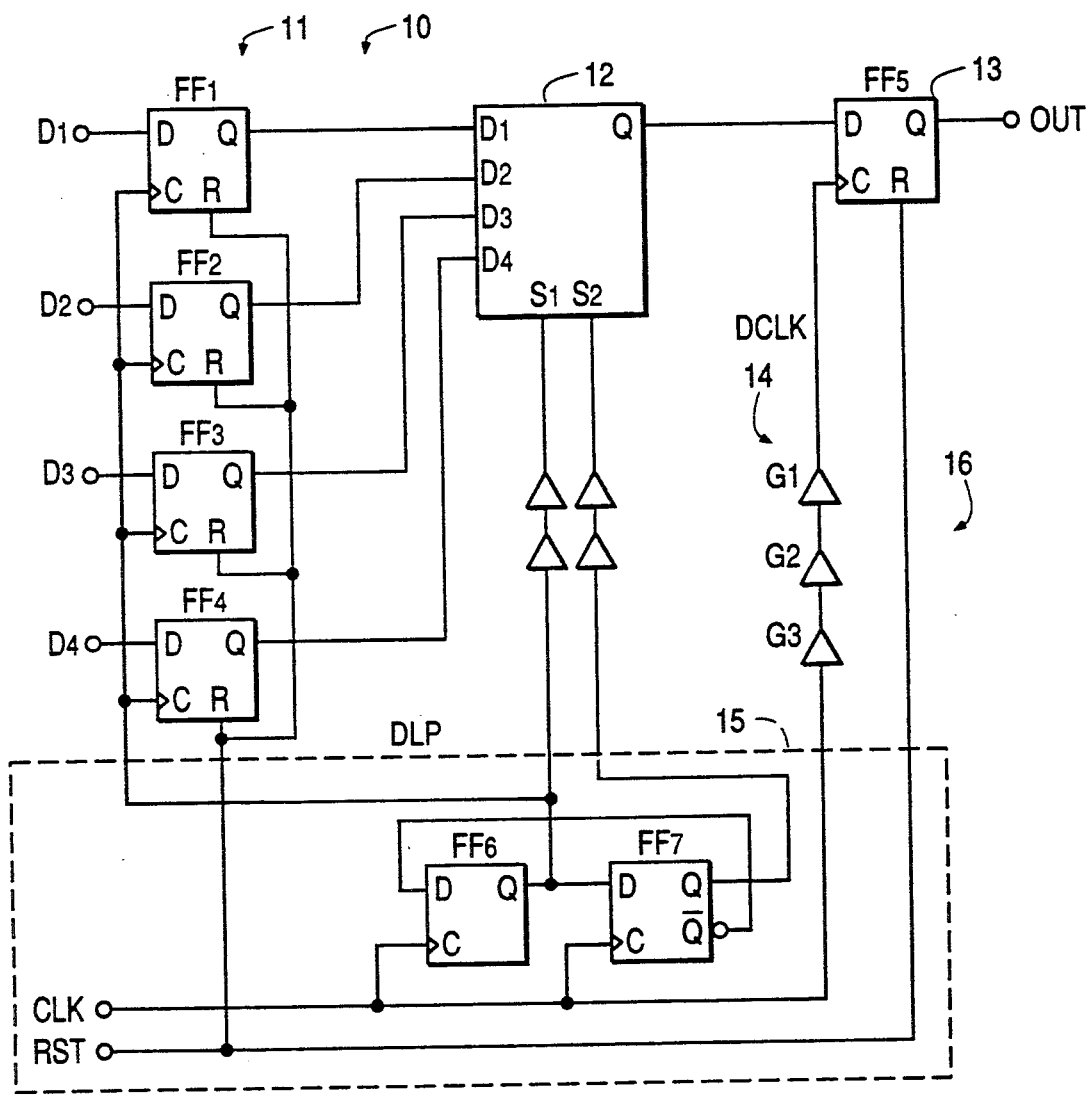
FIG. 13 is a schematic view showing a conventional multiplexer.

FIG. 3A schematically illustrates a multiplexer in which a signal generator according to the present invention is used. The parts identical to corresponding parts of the conventional multiplexer of FIG. 13 will be designated by the same reference numerals and characters. The multiplexer is provided with a data latch 11, a parallel/serial conversion circuit 12, a data latch 13, a Johnson counter 30, and a delay circuit 32 for producing a delayed clock signal DCLK. The Johnson counter 30 comprises two flip-flops FF6 and FF7 and an OR gate 31. To the OR gate 31 are inputted a clock signal CLK and the Q outputs of the flip-flops FF6 and FF7. This embodiment of FIG. 3 differs from the conventional multiplexer of FIG. 13 in that the OR gate 31 is provided to produce a data load pulse signal DLP. The delayed time (about 100 psec.) of the signal DLP can be reduced by the amount of two gate stages, as compared with the delayed time (about 200 psec.) of the signal DLP produced by the flip-flop FF6 of the conventional Johnson counter 15 of FIG. 13. Therefore, the multiplexer according to the present invention can be operated at high speeds, as in the case of FIG. 1. As shown in FIG. 3B, at the first rising edge of the data load pulse signal DLP, parallel data D01, D02, D03 and D04 will be present on the c, d, e and f points of FIG. 3A, respectively. At the rising and falling edges of the clock signals (g and h points of FIG. 3A) inputted to the data select inputs S1 and S2 of the parallel/serial conversion circuit 12, the parallel data D01, D02, D03 and D04 on the c, d, e and f points is converted to serial data D01, D02, D03 and D04 that are present on the i point. The delay of the circuit 12 shown in FIG. 3B is caused by the structural elements constituting the circuit 12. The clock signal DCLK on the j point makes low-to-high transitions at the intermediate points between data edges, as shown in the i and j points of FIG. 3B, so that the noises resulting from the switching of the circuit 12 can be eliminated. The clock signal DCLK is inputted to the C input of the flip-flop FF5 of the data latch 13, which outputs the serial data D01, D02, D03 and D04 on the i point at the rising edges of the clock signal DCLK. That is, the flip-flop FF5 is provided to eliminate the noises described above.

Figure 4:
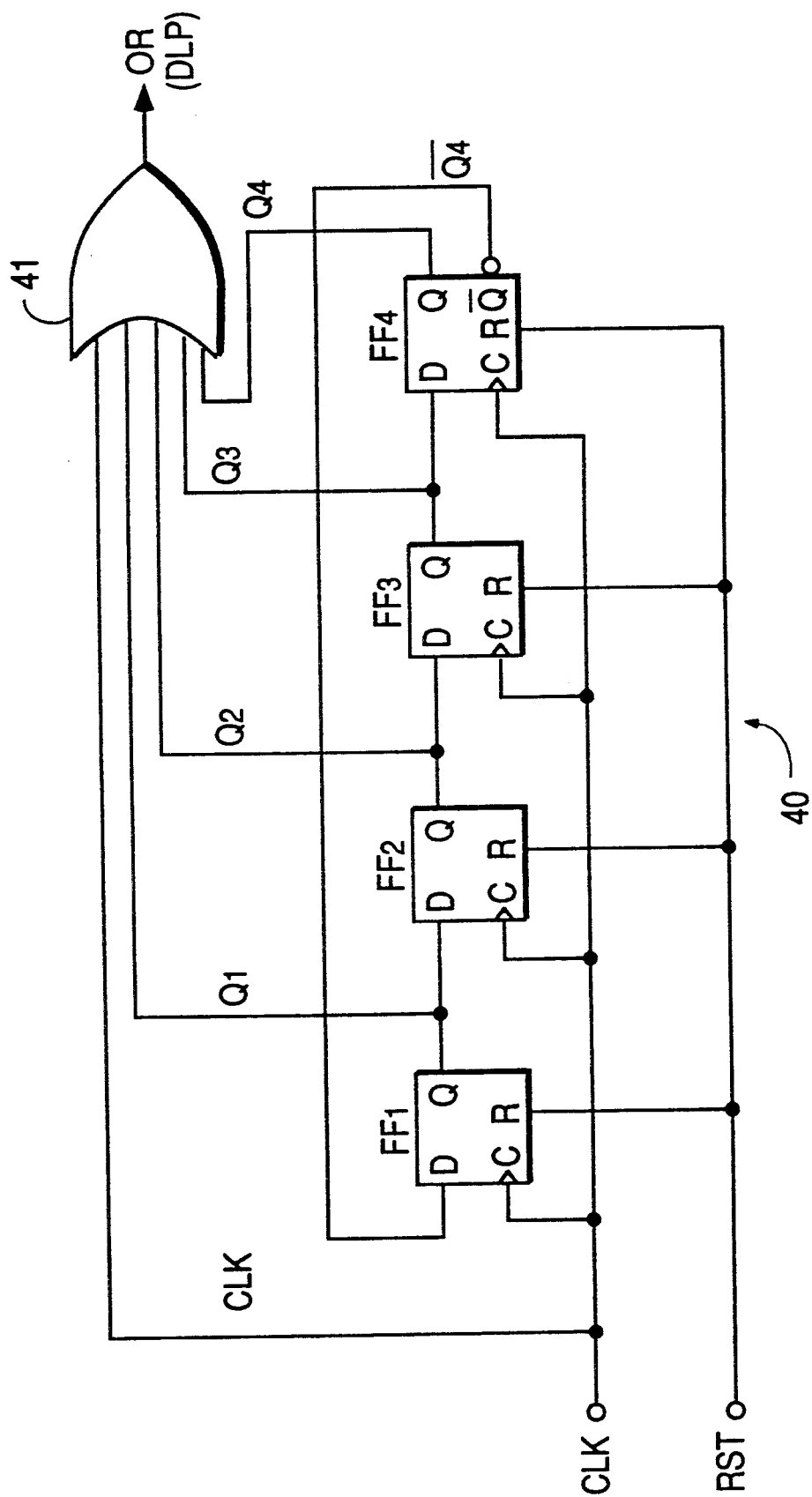
FIG. 4 is a schematic view showing the structure of a first embodiment of the signal generator in accordance with the present invention.

FIG. 4 shows a first embodiment of the signal generator according to the present invention. The signal generator comprises a Johnson counter 40 and an OR gate 41. The Johnson counter 40 has four flip-flops FF1 through FF4. The Q output of one flip-flop is simply connected to the D input of the next, and the Q output of the rightmost stage of the Johnson counter 40 is connected to the D input of the leftmost stage. An input clock signal CLK is connected in parallel t all the flip-flop C inputs. A reset signal RST is also connected in parallel to all the flip-flop R inputs. The clock signal CLK and the Q outputs of the flip-flops are inputted to a logic gate 41, the output (OR) of which is used a data load pulse signal DLP (first signal).

Figure 5:
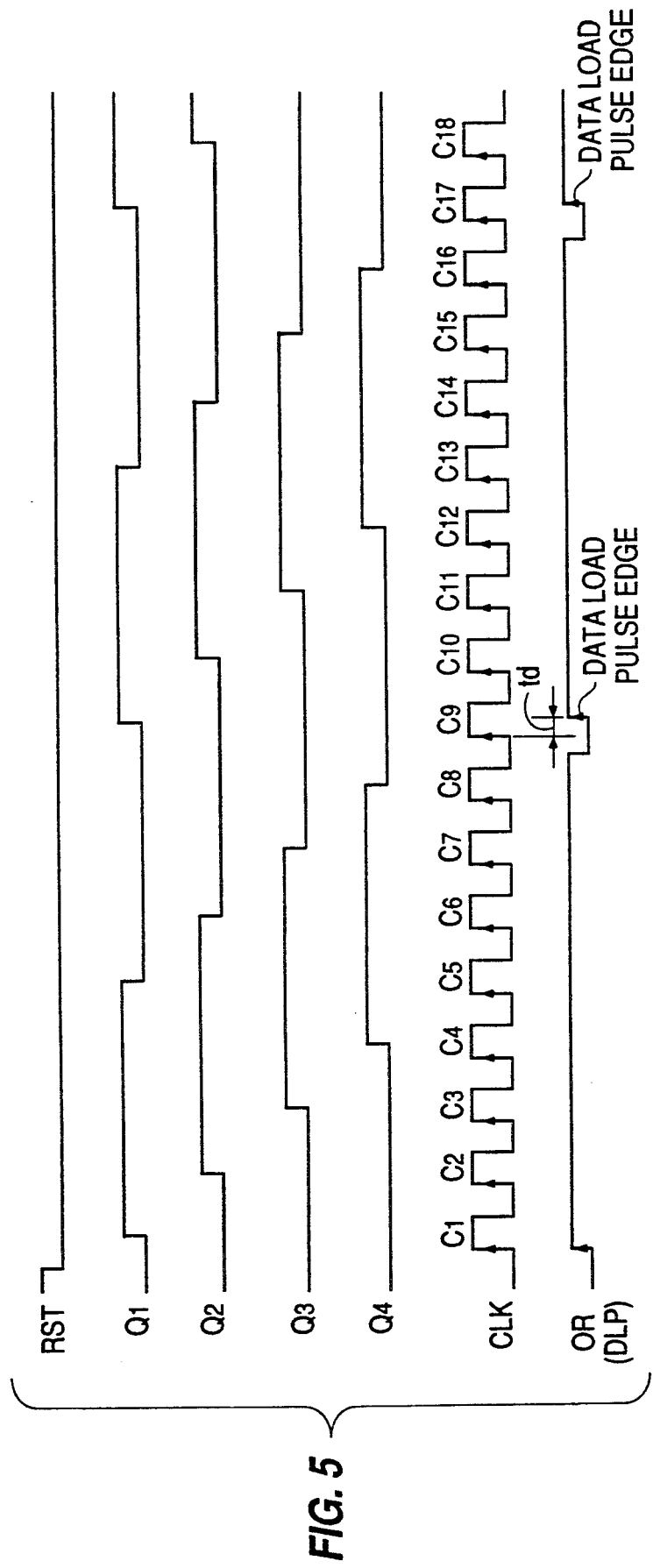
FIG. 5 is a timing diagram showing how the signal generator of FIG. 4 is operated.

FIG. 5 shows the timing diagram of the FIG. 4 embodiment showing how the data load pulse signal DLP (first signal) is obtained. On the eighth clock pulse C8 of the clock signal CLK, the Q output of the flip-flop FF4 of the last stage goes from high level to low level, and all the outputs Q1 through Q4 go low. Therefore, the output OR of the logic gate 41 rises at the time delayed from the rising edge of the ninth clock pulse C9 by td (delay time of one gate stage). This OR change is used as the edge of the data load pulse signal DLP. Thus, in the embodiment of FIG. 4, the data load pulse signal can be obtained at the time delayed from the rising edge of the ninth clock pulse C9 by td. Since td is earlier than td' in the prior art of FIG. 13 by the amount of two gate stages, the delayed amount of the data load pulse signal DLP can be reduced.

Figure 6:
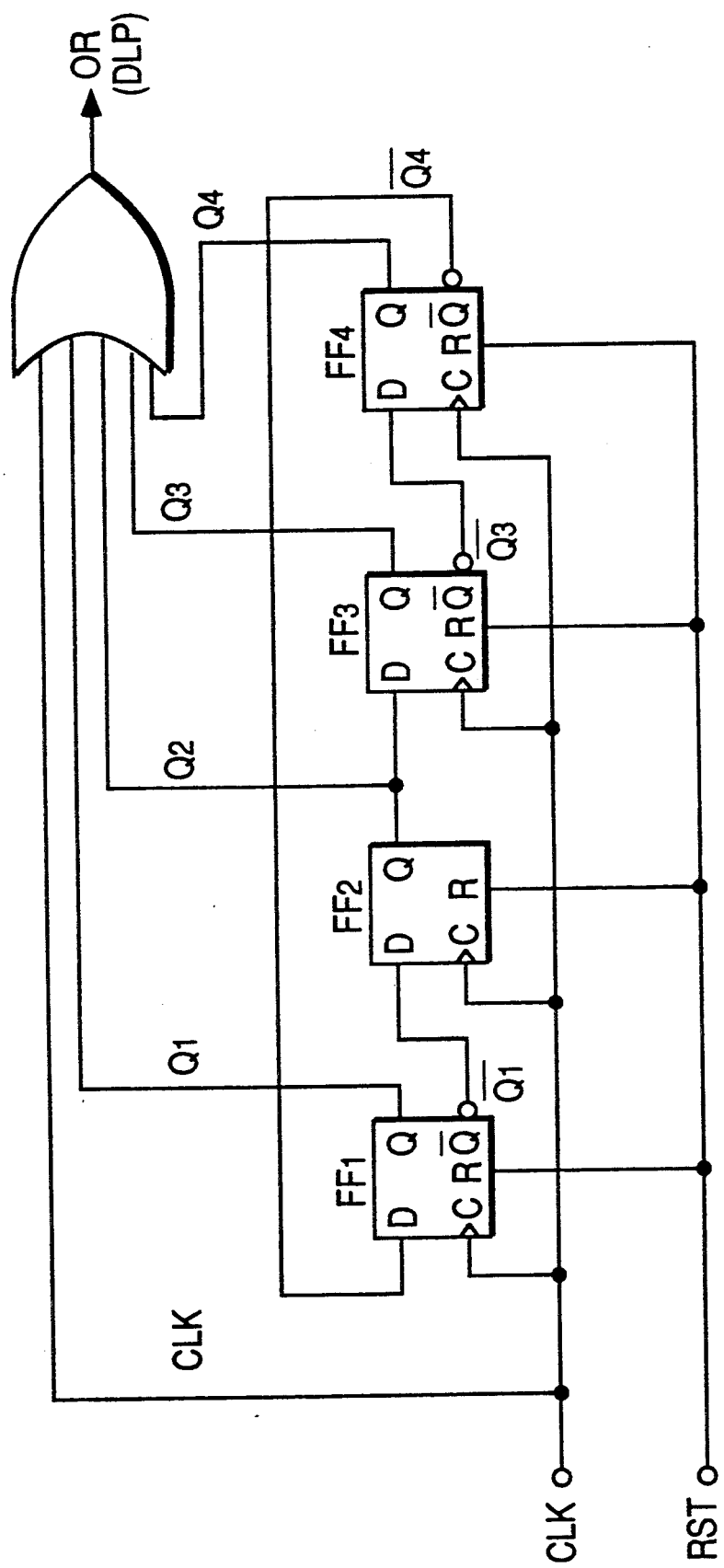
FIG. 6 is a schematic view showing the structure of a second embodiment of the signal generator in accordance with the present invention.
Figure 7:
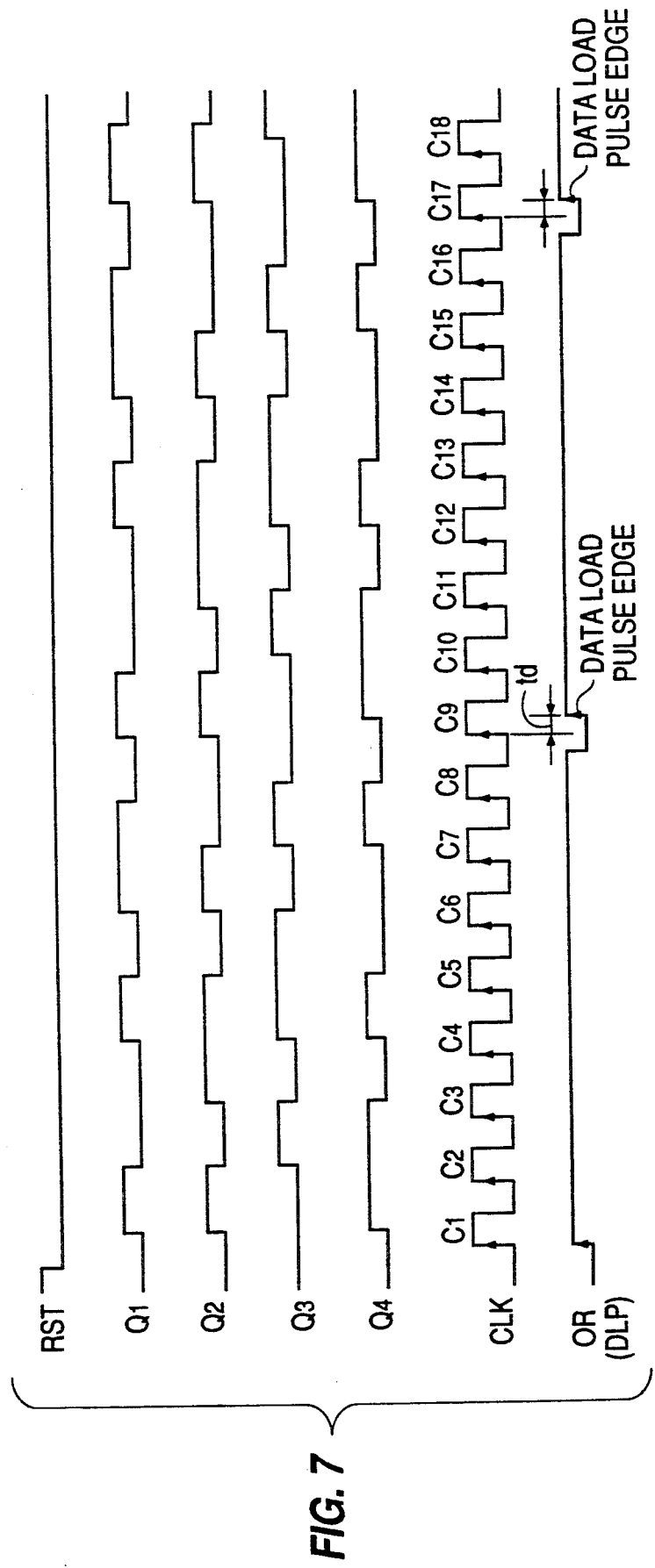
FIG. 7 is a timing diagram showing how the signal generator of FIG. 8 is operated.

FIGS. 6 and 7 illustrate a second embodiment of the signal generator in accordance with the present invention. In this embodiment, the $\overline{Q}$ output of the FF1 is connected to the D input of the FF2, the Q output of FF2 is connected to the D input of the FF3, the $\overline{Q}$ output of the FF3 is connected to the D input of the FF4, and the $\overline{Q}$ output of the FF4 is connected to the D input of FF1. That is to say, the inverted output ($\overline{Q}$) of the flip-flop in an odd number is connected to the D input of the next. As shown in the timing diagram of FIG. 7, the output of the OR gate makes a low-to-high transition at the time delayed from the rising edge of the ninth clock C9 by td, after all the Q outputs of the flip-flops FF1 through FF4 have been low. This low-to high transition is used as a data load pulse edge. Therefore, the same effect as the embodiment of FIG. 5 will be obtained.

Figure 8:
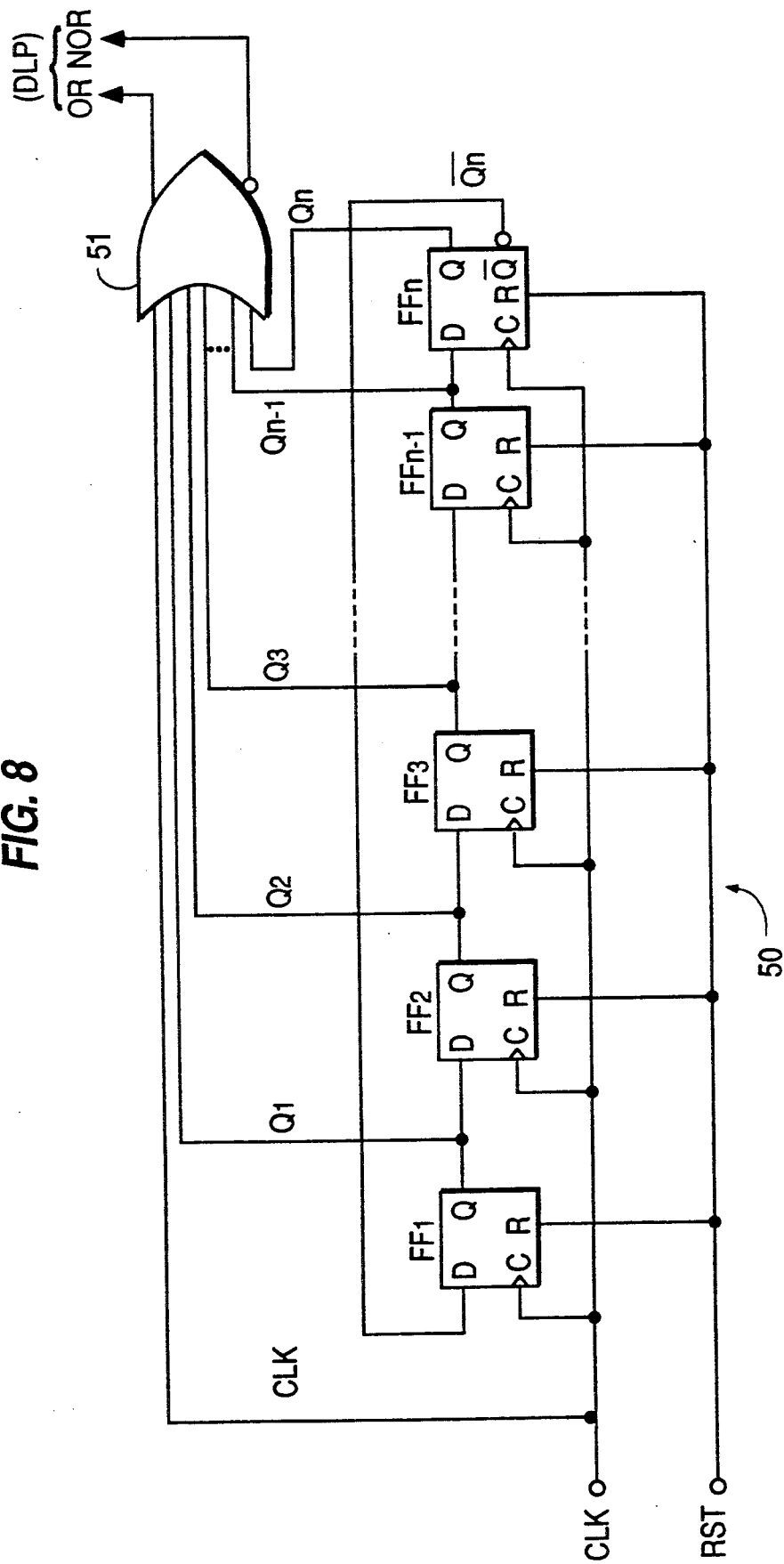
FIG. 8 is a schematic view showing the structure of a third embodiment of the signal generator in accordance with the present invention.

FIG. 8 illustrates a third embodiment of the signal generator in accordance with the present invention. In FIG. 8, reference numeral 50 denotes a Johnson counter comprising n flip-flops FF1 through FFn. The Q output of one flip-flop is simply connected to the D input of the next, and the $\overline{Q}$ output of the rightmost stage of the Johnson counter 50 is connected to the D input of the leftmost stage. An input clock signal CLK is connected in parallel to all the flip-flop C inputs. A reset signal RST is also connected in parallel to all the flip-flop R inputs. The clock signal CLK and the Q outputs of the flip-flops are inputted to a logic gate 51, the output (OR, NOR) of which is used a data load pulse signal DLP (first signal).

Figure 9:
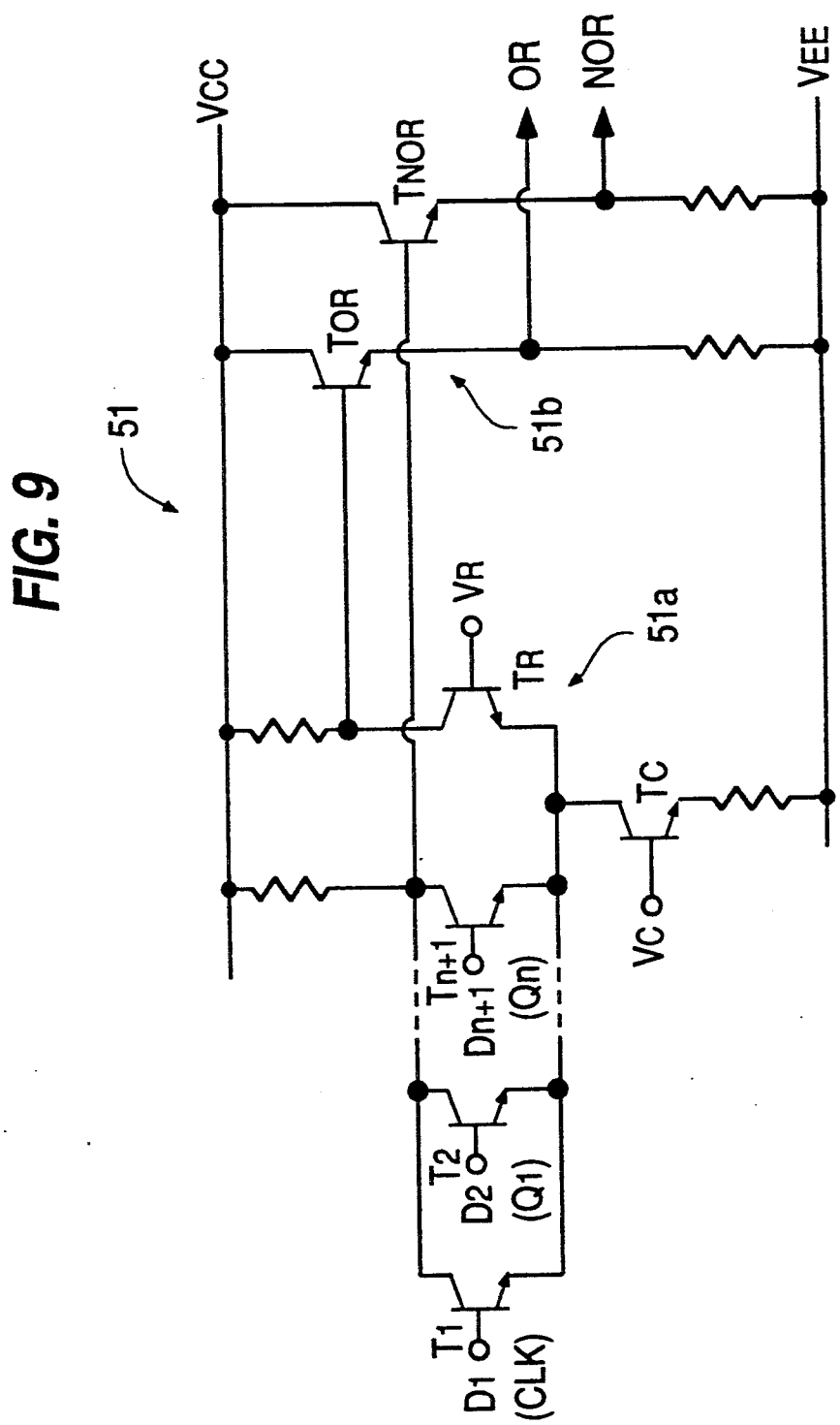
FIG. 9 schematically illustrates the structure of the logic gate of FIG. 8.

FIG. 9 schematically illustrates the circuit structure of the logic gate 51 of FIG. 8. The logic gate 51 comprises a differential part 51a, and an output part 51b having an OR side output transistor $T_{OR}$ and a NOR side output transistor $T_{NOR}$. The differential part 51a has input transistors T1 through Tn+1 corresponding in number to inputs D1 through Dn+1, a reference transistor $T_R$, and a constant-current transistor Tc. The clock signal CLK is inputted to the input D1 of the input transistor T1, and the outputs Q1 through Qn of the Johnson counter 50 of FIG. 8 are inputted to the inputs D2 through Dn+1. The OR gate 51 has an input-output delayed time of td (generally, td=one gate stage).

Figure 10:
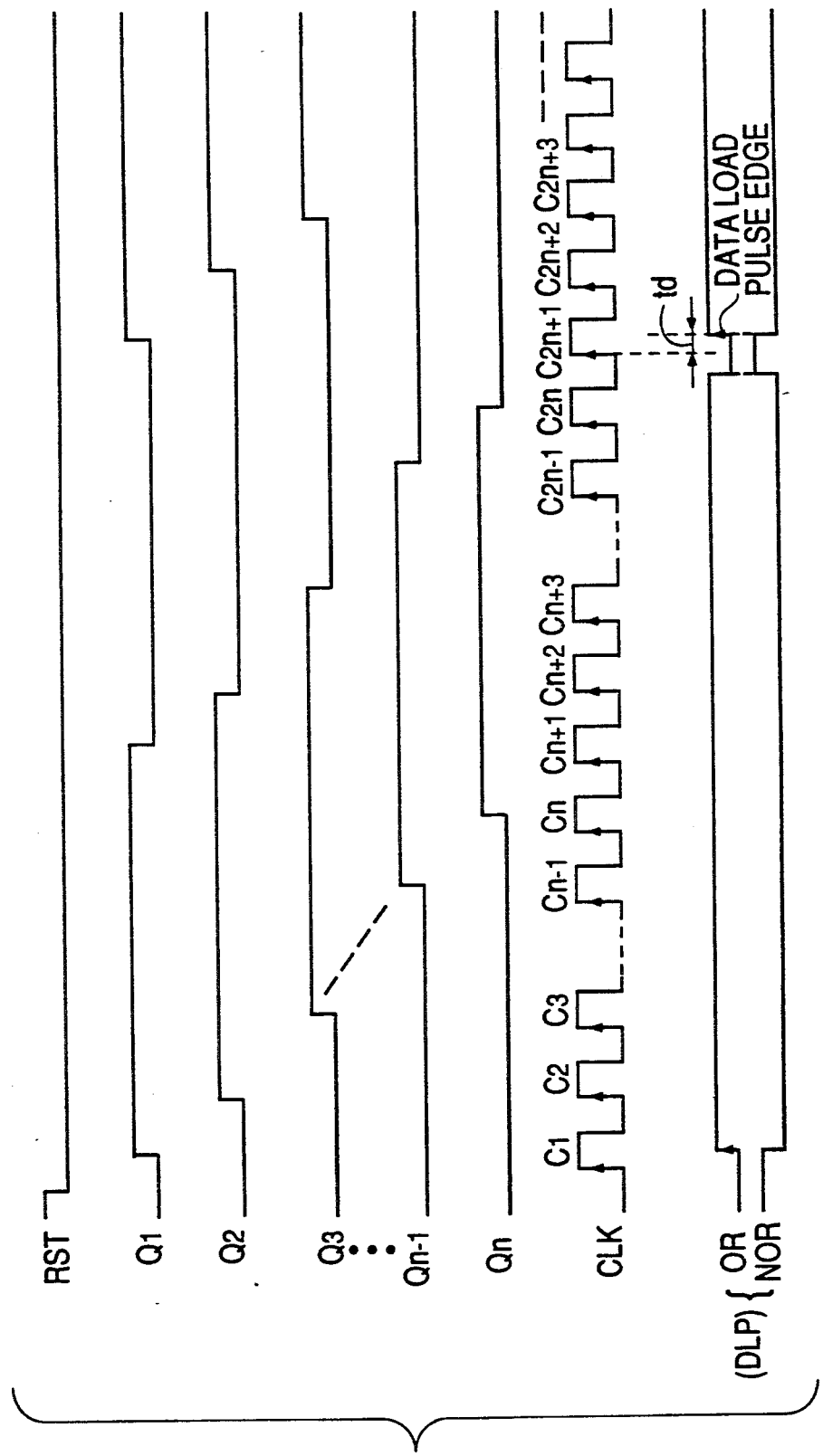
FIG. 10 is a timing diagram showing how the signal generator of FIG. 8 is operated.

FIG. 10 shows the timing diagram of the FIG. 8 embodiment showing how the outputs Q1 through Qn vary with the clock signal CLK. At the 2nth clock pulse C2n of the clock signal CLK, the Qn output of the flip-flop FFn of the last stage goes from high level to low level, and all the outputs Q1 through Qn go low. Therefore, the output OR or NOR of the logic gate 51 rises or falls at the time delayed from the rising edge of the (2n+1)th clock pulse C2n+1 by td (delayed time of one gate stage). This OR or NOR change is used as the edge of the data load pulse signal DLP. Thus, in the embodiment of FIG. 8, the data load pulse signal can be obtained at the time delayed from the rising edge of the (2n+1) clock pulse C2n+1 by td. Since td is earlier than td' in the prior art of FIG. 13 by the amount of two gate stages, the delayed amount of the data load pulse signal DLP can be reduced.

While certain representative embodiments and details have been shown for the purpose of illustrating the invention, it will be apparent to those skilled in this art that various changes and modifications may be made therein without departing from the scope of the invention.

What is claimed is:

1. A signal generator for generating a delayed clock signal comprising:
   a Johnson counter including a plurality of flip-flops having CLOCK inputs connectable to receive a clock signal having Q outputs;
   logic gate means having an input-output delay time and being operatively connectable to receive the clock signal and the Q outputs of said flip-flops, for dividing the clock signal by 2n, where n equals a number of said plurality of flip-flops, and for providing the divided clock signal as a first signal; and
   delay means for delaying the clock signal by the input-output delay time of said logic gate means and for outputting the delayed clock signal as a second signal.

2. A signal generator as set forth in claim 1, wherein said logic gate means comprises an OR gate;

3. A signal generator as set forth in claim 1, wherein said logic gate means includes means for outputting the first signal when the clock signal is high and all the Q outputs of said plurality of flip-flops are low.

4. A signal generator as set forth in claim 2, wherein said logic gate means includes means for outputting the first signal when the clock signal is high and all the Q outputs of said plurality of flip-flops are low.

5. A data demultiplexer for receiving serial data and for outputting parallel data comprising:
   a Johnson counter including a plurality of flip-flops halving CLOCK inputs connectable to receive a clock signal and having Q outputs;
   logic gate means having an input-output delay time and being operatively connectable to receive the clock signal and the Q outputs of said flip-flops, for dividing the clock signal by 2n, where n equals a number of said plurality of flip-flops, and for providing the divided clock signal as a first signal; and
   delay means for delaying the clock signal by the input-output delay time of said logic gate means and for outputting the delayed clock signal as a second signal;
   conversion means for receiving the serial data, for converting the serial data to parallel data in accordance with the second signal and for providing the parallel data; and
   latch means for holding the outputting the parallel data in accordance with the first signal.

6. A data demultiplexer as set forth in claim 5, wherein said logic gate means comprises an OR gate.

7. A data demultiplexer as set forth in claim 5, wherein said logic gate means includes means for outputting the first signal when the clock signal is high and all the Q outputs of said flip-flops are low.

8. A data demultiplexer as set forth in claim 6, wherein said logic gate means includes means for outputting the first signal when the clock signal is high and all the Q outputs of said flip-flops are low.

9. A data demultiplexer as set forth in claim 5, wherein said conversion means comprises:
   a first plurality of flip-flops, each having a Q output, connected in series for receiving the serial data, and wherein said latch means comprises:
   a second plurality of flip-flops corresponding in number to said flip-flops of said conversion means, wherein each of said second plurality of flip-flips has a D input, operatively connected to the Q outputs of said first flip-flops.

10. A data demultiplexer as set forth in claim 9, wherein said first plurality of flip-flops are identical in structure with said plurality of flip-flops of said Johnson converter.

11. A data multiplexer for receiving parallel data and for outputting serial data comprising:
    a Johnson counter including a plurality of flip-flops having CLOCK inputs connectable to receive a clock signal and having Q outputs;
    logic gate means having an input-output delay time and being operatively connectable to receive the clock signal and the Q outputs of said flip-flops, for dividing the clock signal by 2n, where n equals a number of said plurality of flip-flops and for providing the divided clock signal as a first signal;
    delay means for delaying the clock signal by the input-output delay time of said logic gate means and for outputting the delayed clock signal as a second signal;
    conversion means for converting he parallel data to serial data in accordance with the first signal of said logic gate means and for providing the serial data;
    first latch means for holding and outputting the parallel data in accordance with the first signal; and
    second latch means for holding the outputting the serial data in accordance with the second signal of said delay means.

12. A data multiplexer as set forth in claim 11, wherein said logic data means comprises an OR gate.

13. A data multiplexer as set forth in claim 11, wherein said logic gate means includes means for outputting the first signal when the clock signal is high and all the Q outputs of said flip-flops are low.

14. A data multiplexer as set forth in claim 12, wherein said logic gate means includes means for outputting the first signal when the clock signal is high and all the Q outputs of said flip-flops are low.

15. A data multiplexer as set forth in claim 11, wherein said conversion means comprises:
    a multiplexer having a Q output and D inputs, wherein said second latch means comprises:
    a flip-flop having a D input operatively connected to the Q output of said multiplexer, and wherein said first latch means comprises:
    a plurality of flip-flops having Q outputs operatively connected to the D inputs of said multiplexer.

* * * * *

UNITED STATES PATENT AND TRADEMARK OFFICE
CERTIFICATE OF CORRECTION

PATENT NO. : 5,128,673

DATED : July 7, 1992

INVENTOR(S) : Masaya Tamamura et al.

It is certified that error appears in the above-identified patent and that said Letters Patent is hereby corrected as shown below:

Col. 2, line 8, "($SEC_c$)" should be --($SEC_c$).--.

Col. 4, line 60, "DLP the" should be --DLP. The--.

Col. 5, line 52, "t all" should be --to all--.

Col. 6, line 29, "$\bar{Q}$output" should be $\bar{Q}$ output--.

Col. 7, line 37, "halving" should be --having--;
line 54, "the" should be --and--.

Col. 8, line 34, "he" should be --the--;
line 43, "data" should be --gate--.

Signed and Sealed this

Twenty-first Day of September, 1993

Attest:

BRUCE LEHMAN

*Attesting Officer*   *Commissioner of Patents and Trademarks*